(12) United States Patent
Kwon et al.

(10) Patent No.: US 8,507,594 B2
(45) Date of Patent: *Aug. 13, 2013

(54) FLAME RETARDANT THERMOPLASTIC RESIN COMPOSITION WITH IMPROVED COMPATIBILITY

(75) Inventors: Kee Hae Kwon, Gunpo-si (KR); Il Jin Kim, Ansan-si (KR)

(73) Assignee: Cheil Industries Inc., Gumi-si (KR)

( * ) Notice: Subject to any disclaimer, the term of this patent is extended or adjusted under 35 U.S.C. 154(b) by 273 days.

This patent is subject to a terminal disclaimer.

(21) Appl. No.: 12/884,549

(22) Filed: Sep. 17, 2010

(65) Prior Publication Data

US 2011/0009524 A1 Jan. 13, 2011

Related U.S. Application Data

(63) Continuation-in-part of application No. PCT/KR2008/007820, filed on Dec. 31, 2008.

(30) Foreign Application Priority Data

Mar. 21, 2008 (KR) .......................... 10-2008-0026561

(51) Int. Cl.
*C08L 69/00* (2006.01)
*C08L 33/10* (2006.01)

(52) U.S. Cl.
USPC ............. 524/127; 524/94; 524/122; 524/139; 524/140; 524/142; 524/341; 524/371; 524/469; 525/109; 525/133; 525/148

(58) Field of Classification Search
None
See application file for complete search history.

(56) References Cited

U.S. PATENT DOCUMENTS

| | | | |
|---|---|---|---|
| 4,027,073 A | 5/1977 | Clark | |
| 4,045,514 A | 8/1977 | Iwahashi et al. | |
| 4,287,315 A | 9/1981 | Meyer et al. | |
| 4,400,333 A | 8/1983 | Neefe | |
| 4,745,029 A | 5/1988 | Kambour | |
| 4,906,696 A | 3/1990 | Fischer et al. | |
| 5,061,558 A | 10/1991 | Fischer et al. | |
| 5,200,492 A | 4/1993 | Ohnaga et al. | |
| 5,280,070 A | 1/1994 | Drzewinski et al. | |
| 5,284,916 A | 2/1994 | Drzewinski | |
| 5,292,809 A | 3/1994 | Drzewinski et al. | |
| 5,449,557 A | 9/1995 | Liebler et al. | |
| 5,473,019 A * | 12/1995 | Siol et al. ....................... | 525/227 |
| 6,252,002 B1 | 6/2001 | Yamada et al. | |
| 6,646,068 B2 | 11/2003 | Chisholm et al. | |
| 7,067,188 B1 * | 6/2006 | Yang et al. ..................... | 428/327 |
| 7,294,659 B2 | 11/2007 | Yatake | |
| 7,732,515 B2 | 6/2010 | Jang et al. | |
| 2002/0042483 A1 | 4/2002 | Vanderbilt | |
| 2006/0004154 A1 | 1/2006 | DeRudder et al. | |
| 2006/0030647 A1 | 2/2006 | Ebeling et al. | |
| 2009/0080079 A1 | 3/2009 | Kogure et al. | |
| 2009/0118402 A1 | 5/2009 | Jang et al. | |
| 2010/0029855 A1 | 2/2010 | Matsuoka et al. | |
| 2010/0152357 A1 | 6/2010 | Kwon et al. | |
| 2010/0168272 A1 | 7/2010 | Park et al. | |
| 2010/0240831 A1 | 9/2010 | Kim et al. | |
| 2010/0256288 A1 | 10/2010 | Kim et al. | |
| 2011/0021677 A1 | 1/2011 | Kwon et al. | |
| 2011/0040019 A1 * | 2/2011 | Kwon et al. ................... | 524/502 |
| 2011/0160380 A1 * | 6/2011 | Kwon et al. ................... | 524/508 |

FOREIGN PATENT DOCUMENTS

| | | | |
|---|---|---|---|
| EP | 1010725 | A2 | 6/2000 |
| EP | 2204412 | A1 | 7/2010 |
| JP | 04-023856 | A | 1/1992 |
| JP | 04-359954 | A | 12/1992 |
| JP | 06-313089 | A | 11/1994 |
| JP | 2001-049072 | A | 2/2001 |
| JP | 2002-080676 | A | 3/2002 |
| JP | 2005-247999 | A | 9/2005 |
| JP | 2006131833 | * | 5/2006 |
| JP | 2006-249288 | A | 9/2006 |
| JP | 2006-249292 | A | 9/2006 |
| JP | 2006-257284 | A | 9/2006 |
| JP | 2006-257284 | A1 | 9/2006 |
| JP | 2006257126 | * | 9/2006 |
| JP | 2006-342246 | A | 12/2006 |
| KR | 10-2000-0048033 | A | 7/2000 |
| KR | 2004-0079118 | A | 9/2004 |
| KR | 10-0767428 | B1 | 10/2007 |
| WO | 2007/119920 | A1 | 10/2007 |
| WO | 2007/140101 | A1 | 12/2007 |
| WO | 2008/081791 | A1 | 7/2008 |
| WO | 2009/078593 | A1 | 6/2009 |
| WO | 2009/078602 | A1 | 6/2009 |
| WO | 2009/113762 | A2 | 9/2009 |
| WO | 2009/116722 | A1 | 9/2009 |
| WO | 2009/128601 | A1 | 10/2009 |

OTHER PUBLICATIONS

Katritzky, Correlation and Prediction of the Refractive Indices of Polymers by QSPR; Journal of Chemical Information and Computer Sciences; 1998; pp. 1171-1176.*

(Continued)

*Primary Examiner* — David Buttner
(74) *Attorney, Agent, or Firm* — Summa, Additon & Ashe, P.A.

(57) ABSTRACT

Disclosed herein is a flame retardant thermoplastic resin composition including a polycarbonate resin, a branched acrylic copolymer, and a flame retardant. The flame retardant thermoplastic resin composition can have good compatibility as well as good flame retardancy, scratch resistance, colorability and appearance without requiring the addition of a compatibilizer.

19 Claims, 3 Drawing Sheets

(56) References Cited

OTHER PUBLICATIONS

European Search Report in counterpart European Application No. 08873425.6 dated May 29, 2012, pp. 1-5.
International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in counterpart International Application No. PCT/KR2008/007820 dated Jul. 28, 2009.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 mailed Nov. 8, 2011, pp. 1-10.
Chinese Office Action in commonly owned Chinese Application No. 200910211954 dated Jun. 23, 2011, pp. 1-5.
English Translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 mailed Dec. 14, 2011, pp. 1-9.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
European Search Report in commonly owned European Application No. 10196806 dated Apr. 27, 2011, pp. 1-5.
Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
Final Office Action in commonly owned U.S. Appl. No. 12/631,018 mailed Apr. 26, 2012, pp. 1-12.
Notice of Allowance in commonly owned U.S. Appl. No. 12/642,904 mailed Jul. 2, 2012, pp. 1-8.
Office Action in commonly owned U.S. Appl. No. 12/631,018 mailed Apr. 26, 2012, pp. 1-12.
Office Action in commonly owned U.S. Appl. No. 12/642,904 mailed Mar. 27, 2012, pp. 1-7.
Office Action in commonly owned U.S. Appl. No. 12/817,302 mailed Mar. 29, 2012, pp. 1-5.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.
Advisory Action in commonly owned U.S. Appl. No. 12/631,018 mailed Nov. 7, 2012, pp. 1-4.

\* cited by examiner

FLAME RETARDANT THERMOPLASTIC RESIN COMPOSITION WITH IMPROVED COMPATIBILITY

CROSS-REFERENCE TO RELATED APPLICATIONS

This application is a continuation-in-part of International Application No. PCT/KR2008/007820, filed Dec. 31, 2008, pending, which designates the U.S., published as WO 2009/116722, and is incorporated herein by reference in its entirety, and claims priority therefrom under 35 USC Section 120. This application also claims priority under 35 USC Section 119 from Korean Patent Application No. 10-2008-0026561, filed Mar. 21, 2008, in the Korean Intellectual Property Office, the entire disclosure of which is also incorporated herein by reference.

FIELD OF THE INVENTION

The present invention relates to a flame retardant thermoplastic resin composition that can have improved compatibility.

BACKGROUND OF THE INVENTION

Generally, thermoplastic resins have lower specific gravity than glasses and metals and can have good physical properties such as moldability and impact resistance. However, many thermoplastic resins can have poor surface scratch resistance. For example, polycarbonate resins can have excellent mechanical strength, flame retardancy, transparency, and weatherability, in addition to good impact resistance, thermal stability, self-extinguishing property, and dimensional stability. Polycarbonate resins accordingly have been widely used in electrical and electronic products and parts of automobiles. Although the polycarbonate resins can be a substitute for products including conventional glasses that can require both transparency and impact resistance, polycarbonate resins generally have poor scratch resistance.

In contrast, polymethylmethacrylate resins can have good transparency, weatherability, mechanical strength, surface gloss, adhesive strength, and excellent scratch resistance. Polymethylmethacrylate resins, however, may not have adequate impact resistance and flame retardancy for various applications.

Conventionally, a hard coating method has been used to improve the scratch resistance of plastic products. The hard coating method can include the steps of coating a surface of an injection-molded resin with an organic-inorganic hybrid material and curing the organic-inorganic hybrid material on the surface of the resin using heat or ultra violet light. However, the hard coating method requires an additional coating step, which can increase processing times and manufacturing costs and it may cause environmental problems. With recent increased interest in environmental protection and reduction of manufacturing costs, there is a need for a non-coated resin which has scratch resistance without using the hard coating method. Also, it is important to develop a resin with good scratch resistance for the housing manufacturing industry.

One attempt to improve scratch resistance of thermoplastic resins alloys acrylic resin such as polymethylmethacrylate with good scratch resistance with polycarbonate resin. However, it can be difficult to obtain high transparency and colorability using this method due to the difference between the refractive indices of the polycarbonate resin and the acrylic resin.

Korean Patent Publication Laid-open No. 2004-0079118 discloses a method of lowering the molecular weight of polycarbonate during a kneading process using metal stearic acid ester in order to improve the compatibility between a polycarbonate resin and a methacrylate resin. However, the blend of the polycarbonate and the methacrylate resin can have significantly reduced mechanical properties.

U.S. Pat. No. 4,287,315 discloses a methacrylate resin with good impact strength using an ethylene-vinyl acetate rubber. A blend of polycarbonate and the methacrylate resin, however, can have low transparency.

SUMMARY OF THE INVENTION

The present inventors have developed a thermoplastic resin composition that can have improved flame retardancy and scratch resistance as well as high transparency and high colorability. The thermoplastic resin composition of the invention includes a branched (meth)acrylic copolymer resin with a high refractive index and flame retardant. The branched (meth)acrylic copolymer resin with a high refractive index and flame retardant can be blended with a polycarbonate resin and a (meth)acrylic resin to improve the compatibility of the resins and to reduce the difference between the refractive indices of the polycarbonate resin and the (meth)acrylic resin. The resultant thermoplastic resin composition of the invention can have improved compatibility, good flame retardancy and scratch resistance, with minimal deterioration of transparency and colorability.

The flame retardant thermoplastic resin composition of the invention can be useful in various applications including parts of electrical and electronic appliances, parts of automobiles, lenses, window glasses, and the like, due to its good scratch resistance, high colorability, and high transparency.

The present invention further provides a molded article produced from the flame retardant thermoplastic resin composition.

Other aspects, features and advantages of the present invention will be apparent from the ensuing disclosure and appended claims.

The flame retardant thermoplastic resin composition of the present invention comprises (A) about 20 or more but less than about 100% by weight of a polycarbonate resin; (B) more than about 0 but not more than about 80% by weight of a branched (meth)acrylic copolymer resin; and (C) about 1 to about 50 parts by weight of a flame retardant, per 100 parts by weight of a base resin comprising (A)+(B).

In an exemplary embodiment, the flame retardant thermoplastic resin composition may comprise (A) about 40 to about 90% by weight of a polycarbonate resin; (B) about 10 to about 60% by weight of a branched (meth)acrylic copolymer resin; and (C) about 10 to about 30 parts by weight of a flame retardant, per 100 parts by weight of a base resin comprising (A) and (B).

In an exemplary embodiment, the branched (meth)acrylic copolymer resin (B) may have a weight average molecular weight of about 100,000 to about 3,500,000. In another exemplary embodiment, the methacrylic copolymer resin (B) may have a weight average molecular weight of about 500,000 to about 3,000,000. In another exemplary embodiment, the methacrylic copolymer resin (B) may have a weight average molecular weight of about 1,000,000 to about 2,500,000.

Further, the branched (meth)acrylic copolymer resin (B) may have a refractive index of about 1.495 to about 1.575. In an exemplary embodiment, the refractive index may be about 1.50 to about 1.575, or about 1.51 to about 1.575.

The branched (meth)acrylic copolymer resin (B) may be a copolymer of (b1) an aromatic methacrylate, an aliphatic methacrylate, or a mixture thereof, and (b3) a branch-inducing monomer, or a mixture of copolymers thereof. In an exemplary embodiment, the branched (meth)acrylic copolymer resin (B) may further comprise a mono-functional unsaturated monomer.

In an exemplary embodiment, the branched (meth)acrylic copolymer resin (B) may be a copolymer of about 5 to about 99.999% by weight of the aromatic methacrylate, aliphatic methacrylate, or a mixture thereof (b1), about 0 to about 85% by weight of the mono-functional unsaturated monomer (b2), and about 0.001 to about 10% by weight of the branch-inducing monomer, or a mixture of copolymers thereof.

The flame retardant (C) may be a phosphorus-containing flame retardant, a halogen-containing flame retardant, or a mixture thereof. In exemplary embodiments, the flame retardant may be a phosphorus-containing flame retardant such as a phosphate, a phosphonate, a phosphinate, a phosphine oxide, a phosphazene or a metal salt thereof; a halogen-containing flame retardant such as decabromo diphenylether, decabromo diphenylethane, tetrabromo bisphenol A, tetrabromo bisphenol A-epoxy oligomer, octabromo trimethylphenyl phosphate, ethylene bistetrabromophthalimide, tris(tribromophenol)triazine, or brominated polystyrene; or a mixture thereof.

In another exemplary embodiment, the flame retardant thermoplastic resin composition may further comprise (D) more than 0 and up to 80 parts by weight of a (meth)acrylic resin, based on 100 parts by weight of (A)+(B). In another embodiment, the flame retardant thermoplastic resin composition may further comprise about 10 to about 30 parts by weight of a (meth)acrylic resin (D), based on 100 parts by weight of (A)+(B). In another embodiment, the flame retardant thermoplastic resin composition may further comprise about 30 to about 60 parts by weight of a (meth)acrylic resin (D), based on 100 parts by weight of (A)+(B). The (meth)acrylic resin (D) may have a linear structure.

In exemplary embodiments, the (meth)acrylic resin (D) can be a homopolymer of a (meth)acrylic monomer, a copolymer of two or more (meth)acrylic monomers, or a mixture thereof.

The flame retardant thermoplastic resin composition of the present invention may optionally further comprise one or more additives selected from the group consisting of flame retardant aids, antimicrobials, releasing agents, thermal stabilizers, antioxidants, light stabilizers, compatibilizer, dyes, inorganic fillers, surfactants, nucleating agents, coupling agents, fillers, plasticizers, impact modifiers, coloring agents, stabilizers, lubricants, antistatic agents, pigments, flameproof agents, and mixtures thereof.

In an exemplary embodiment, the flame retardant thermoplastic resin composition may have a complex viscosity ($\eta^*$) of about 1,000 Pas to about 10,000 Pas at 240° C. and 0.1 rad/s. In another exemplary embodiment, the flame retardant thermoplastic resin composition may have a complex viscosity ($\eta^*$) of about 1,000 Pas to about 5,000 Pas at 240° C. and 0.1 rad/s. In another embodiment, the complex viscosity may be about 5,500 Pas to about 10,000 Pas. Furthermore, at 240° C., the ratio of $\eta^*$(0.1 rad/s)/$\eta^*$(100 rad/s) may range from about 3.0 to about 100.0. In another exemplary embodiment, the ratio of $\eta^*$(0.1 rad/s)/$\eta^*$(100 rad/s) may range from about 3.5 to about 30.0. In another exemplary embodiment, the ratio of $\eta^*$(0.1 rad/s)/$\eta^*$(100 rad/s) may range from about 30.0 to about 75.0. In another exemplary embodiment, the ratio of $\eta^*$(0.1 rad/s)/$\eta^*$(100 rad/s) may range from about 75.0 to about 100.0.

The present invention provides a molded article produced from the foregoing flame retardant thermoplastic resin composition. The present invention now will be described more fully hereinafter in the following detailed description of the invention.

DETAILED DESCRIPTION OF THE INVENTION

Figure 1:
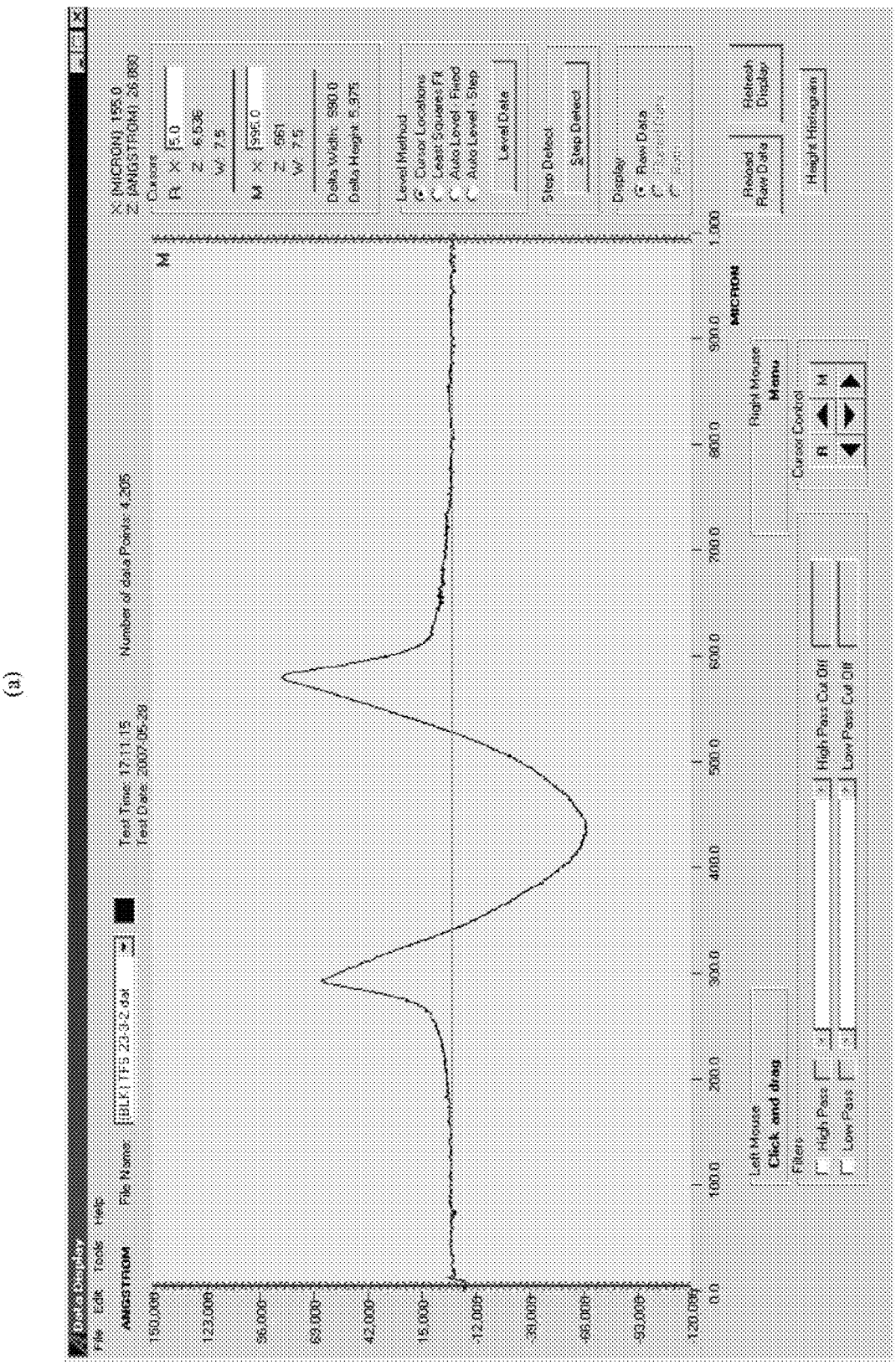
FIG. 1(*a*) is a scratch profile of a specimen prepared in Example 2 and FIG. 1(*b*) is a scratch profile of a specimen prepared in Comparative Example 3.
Figure 1:
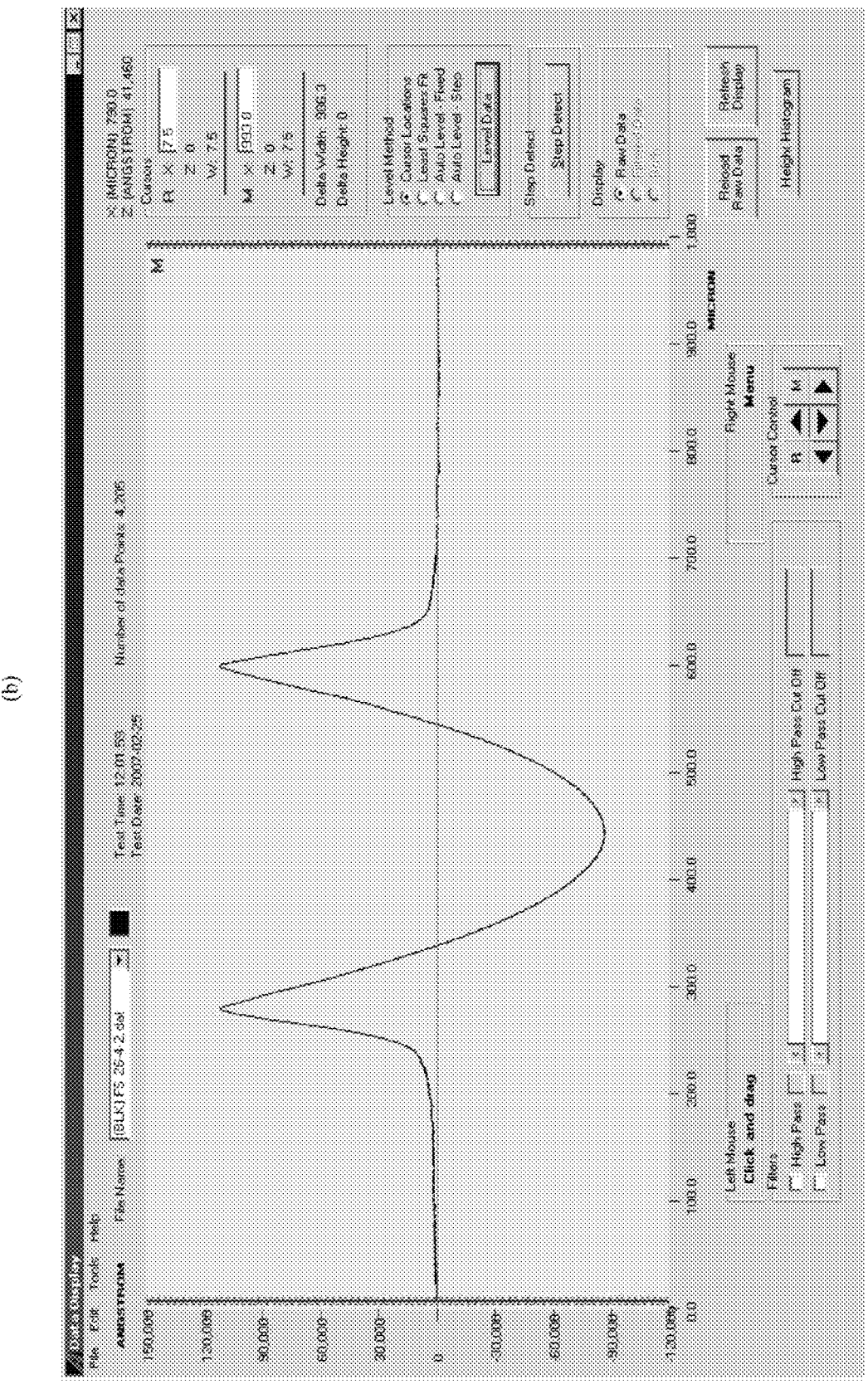

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polycarbonate Resin

The polycarbonate resin of the present invention may be prepared by any conventional method well known to those skilled in the art. For example, the polycarbonate resin may be prepared by reacting dihydric phenol compound with phosgene in the presence of a catalyst and a molecular weight controlling agent. Also, the polycarbonate resin may be prepared by transesterification of a carbonate precursor such as dihydric phenol compound and diphenylcarbonate.

The dihydric phenol compound may be a bisphenol compound, such as 2,2-bis(4-hydroxyphenyl)propane (bisphenol A). The bisphenol A may be partially or totally substituted with another dihydric phenol. In addition to bisphenol A, other examples of dihydric phenols may include without limitation hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, and the like, as well as halogenated bisphenol such as 2,2-bis(3,5-dibromo-4-hyroxyphenyl)propane, and mixtures thereof.

However, the dihydric phenol compound applicable for preparing the polycarbonate resin is not limited to the aforementioned compounds.

The polycarbonate resin used in the present invention may be a homopolymer, a copolymer of two or more types of dihydric phenols, or a mixture thereof.

Examples of polycarbonate resin useful in the present invention may also include, without limitation, linear polycarbonate resin, branched polycarbonate resin, polyester carbonate copolymer resin and the like, and mixtures thereof.

Exemplary linear polycarbonate resins include, without limitation, bisphenol A-based polycarbonate resins. Exemplary branched polycarbonate resins may be prepared, without limitation, by reacting poly-functional aromatic compounds such as trimellitic anhydride, trimellitic acid, and the like, with one or more dihydric phenol compounds and carbonate precursors. Exemplary polyester carbonate copolymer resins may also be prepared, without limitation, by reacting di-functional carboxylic acid with one or more dihydric phenol compounds and carbonate precursors. The linear polycarbonate resin, the branched polycarbonate resin and the polyester carbonate copolymer resin can be used alone or in combination with one another.

In an exemplary embodiment, the polycarbonate resin may have a weight average molecular weight of about 10,000 to about 200,000 g/mol, for example about 15,000 to about 80,000 g/mol, or about 20,000 to about 50,000 g/mol.

According to the present invention, the flame retardant thermoplastic resin composition may include the polycarbonate resin in an amount of about 20% by weight or more but less than about 100% by weight, for example about 40 to about 90% by weight. If the amount of polycarbonate is less than about 20% by weight, it can be difficult to obtain good mechanical properties in the polycarbonate resin. Exemplary flame retardant thermoplastic resin compositions of the invention having good scratch resistance can include about 45 to about 80% by weight of the polycarbonate resin. In another exemplary embodiment, the polycarbonate resin may be used in an amount of about 55 to about 85% by weight. In another exemplary embodiment, the polycarbonate resin may be used in an amount of about 75 to about 90% by weight. In another exemplary embodiment, the polycarbonate resin may be used in an amount of about 50 to about 70% by weight.

In some embodiments, the flame retardant thermoplastic resin composition may include the polycarbonate resin in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% by weight, or higher so long as the composition does not include 100% by weight polycarbonate resin (i.e., another component is present in the composition). Further, according to some embodiments of the present invention, the amount of the polycarbonate resin can be in a range from about any of the foregoing amounts to about any other of the foregoing amounts.

(B) Branched (Meth)Acrylic Copolymer Resin

The branched (meth)acrylic copolymer resin of the present invention may be a copolymer of (b1) an aromatic methacrylate, an aliphatic methacrylate, or a mixture thereof, and (b3) a branch-inducing monomer, or a mixture of copolymers thereof. The branched (meth)acrylic copolymer resin may have a branched structure with partial crosslinking. In an exemplary embodiment, the branched (meth)acrylic copolymer resin may further comprise (b2) a mono-functional unsaturated monomer.

In an exemplary embodiment, the branched (meth)acrylic copolymer resin of the present invention may be prepared by polymerizing a monomer mixture comprising (b1) about 5 to about 99.999% by weight of an aromatic methacrylate, an aliphatic methacrylate, or a mixture thereof, (b2) about 0 to about 85% by weight of a, mono-functional unsaturated monomer, and (b3) about 0.001 to about 10% by weight of a branch-inducing monomer.

In some embodiments, the branched (meth)acrylic copolymer resin of the present invention may be prepared by polymerizing a monomer mixture comprising (b1) about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 99.999% by weight of an aromatic methacrylate, an aliphatic methacrylate, or a mixture thereof. Further, according to some embodiments of the present invention, the amount of the aromatic methacrylate, aliphatic methacrylate, or mixture thereof, can be in a range from about any of the foregoing amounts to about any other of the foregoing amounts.

The aromatic or aliphatic methacrylate (b1) may have a hydrocarbon group having 6 to 20 carbon atoms, and may be represented by the following Chemical Formula 1, Chemical Formula 2, or a mixture thereof.

[Chemical Formula 1]

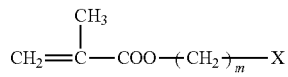

wherein m is an integer from 0 to 10, and X comprises a cyclohexyl group, a phenyl group, a methylphenyl group, a methylethylphenyl group, a propylphenyl group, a methoxyphenyl group, a cyclohexylphenyl group, a chlorophenyl group, a bromophenyl group, a phenylphenyl group, or a benzylphenyl group.

[Chemical Formula 2]

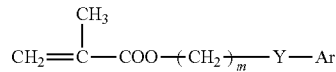

wherein m is an integer from 0 to 10, Y is oxygen (O) or sulfur (S), and Ar comprises a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group.

Exemplary aromatic methacrylates and aliphatic methacrylates (b1) may include, but are not limited to, cyclohexyl methacrylate, phenoxy methacrylate, phenoxyethyl methacrylate, 2-ethylthiophenyl methacrylate, phenyl methacrylate, benzyl methacrylate, 2-phenylethyl methacrylate, 3-phenylpropyl methacrylate, 4-phenylbutyl methacrylate, 2-(2-methylphenyl)ethyl methacrylate, 2-(3-methylphenyl)ethyl methacrylate, 2-(4-methylphenyl)ethyl methacrylate, 2-(4-propylphenyl)ethyl methacrylate, 2-(4-(1-methylethyl)phenyl)ethyl methacrylate, 2-(4-methoxyphenyl)ethylmethacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, and 2-(4-benzylphenyl)ethyl methacrylate, and the like. They may be used alone or in combination with one another.

The aromatic or aliphatic methacrylate (b1) may be used in an amount of about 5 to about 99.999% by weight, for example about 20 to about 99% by weight, and as another example about 45 to about 90% by weight, based on the total weight of the monomer mixture. If the amount of the aromatic or aliphatic methacrylate (b1) is less than about 5% by weight, the average refractive index of polymerized (meth)acrylic copolymer may be lowered to less than 1.495.

Exemplary mono-functional unsaturated monomers (b2) may include, but is not limited to, methacrylic acid ester monomers including methyl methacrylate, ethyl methacrylate, n-propyl methacrylate, n-butyl methacrylate, hexyl methacrylate, and 2-ethylhexyl methacrylate; acrylic acid ester monomers including methyl acrylate, ethyl acrylate, propyl acrylate, butyl acrylate, hexyl acrylate, and 2-ethyl hexyl acrylate; unsaturated carboxylic acid monomers including acrylic acid and methacrylic acid; acid anhydride monomers including maleic anhydride; hydroxyl group containing ester monomers including 2-hydroxyethyl acrylate, 2-hydroxypropyl acrylate, and monoglycerol acrylate; and the like, and mixtures thereof.

The branched (meth)acrylic copolymer resin may optionally comprise the mono-functional unsaturated monomer (b2). The mono-functional unsaturated monomer (b2) may be used in an amount of about 85% by weight or less, for example about 1 to about 70% by weight, and as another example about 10 to about 60% by weight, based on the total weight of the monomer mixture.

In some embodiments, the mono-functional unsaturated monomer (b2) may not be present (0% by weight). In some embodiments, the mono-functional unsaturated monomer (b2) may be present, i.e., the branched (meth)acrylic copolymer resin of the present invention may include the mono-functional unsaturated monomer (b2) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85% by weight. Further, according to some embodiments of the present invention, the amount of the mono-functional unsaturated monomer (b2) can be in a range from about any of the foregoing amounts to about any other of the foregoing amounts.

Exemplary branch-inducing monomers (b3) may include, but are not limited to, silicone-containing branch-inducing monomers having a vinyl functional group, ester-containing branch-inducing monomers, aromatic branch-inducing monomers, and the like. These monomers may be used alone or in combination with one another. The number of the functional groups of the branch-inducing monomer may be from 2 to 4. A branched copolymer having ultra-high molecular weight with partial crosslinking may be prepared by using the branch-inducing monomers having such functional groups.

Examples of the branch-inducing monomer (b3) may include without limitation silane or siloxane compounds, aromatic crosslinking monomers, vinyl group-containing monomers, allyl compounds, polyalkylene glycol di(meth)acrylate compounds, and the like, and mixtures thereof.

Specific examples of the branch-inducing monomer (b3) may include without limitation silane or siloxane compounds including unsaturated hydrocarbon group-containing silicone-containing crosslinking monomers such as divinyl tetramethyl disiloxane, and tetramethyl tetravinyl cyclotetrasiloxane; aromatic crosslinking monomers including divinylbenzene; vinyl group-containing monomers including 1,4-divinyloxybutane and divinylsulfone; allyl compounds including diallyl phthalate, diallylacrylamide, triallyl (iso) cyanurate, and triallyl trimelitate; and (poly)alkylene glycol di(meth)acrylate compounds including 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta (meth)acrylate, glycerol tri(meth)acrylate, and the like. They may be used alone or in combination with one another.

The branch-inducing monomer (b3) may be used in an amount of about 0.001 to about 10% by weight, for example about 0.01 to about 7% by weight, and as another example about 0.1 to about 5% by weight. In some embodiments, the branched (meth)acrylic copolymer resin may include the branch-inducing monomer (b3) in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10% by weight. Further, according to some embodiments of the present invention, the amount of the branch-inducing monomer (b3) can be in a range from about any of the foregoing amounts to about any other of the foregoing amounts.

If the amount of the branch-inducing monomer (b3) is less than about 0.001% by weight, an ultra-high molecular weight branched structure may not be obtained, and if the amount of the branch-inducing monomer (b3) is more than about 10% by weight, processability and compatibility with a polycarbonate resin may decrease.

The branched (meth)acrylic copolymer resin (B) may be prepared by conventional methods such as bulk polymerization, emulsion polymerization, and suspension polymerization.

The branched (meth)acrylic copolymer resin (B) may have a higher refractive index than conventional acrylic copolymers. Conventional polycarbonates have a refractive index of about 1.590 and polymethylmethacrylates have a refractive index of about 1.490. The branched (meth)acrylic copolymer resin of the present invention can have a refractive index in between, that is, from about 1.495 to about 1.575. In some embodiments, the branched (meth)acrylic copolymer resin may have a refractive index of about 1.50 to about 1.575, or about 1.51 to about 1.575.

Furthermore, the branched (meth)acrylic copolymer may have a weight average molecular weight of about 100,000 to about 3,500,000. In an exemplary embodiment, the branched (meth)acrylic copolymer may have a weight average molecular weight of about 500,000 to about 3,000,000. In another exemplary embodiment, the branched (meth)acrylic copolymer may have a weight average molecular weight of about 1,000,000 to about 2,500,000.

The flame retardant thermoplastic resin composition may include the branched (meth)acrylic copolymer resin (B) in an amount of more than about 0 but not more than about 80% by weight, for example about 5 to about 70% by weight, as another example about 10 to about 50% by weight, and as another example about 10 to about 40% by weight. In some embodiments, the flame retardant thermoplastic resin composition may include the branched (meth)acrylic copolymer resin (B) in an amount of greater than about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the branched (meth)acrylic copolymer resin (B) can be in a range from about any of the foregoing amounts to about any other of the foregoing amounts.

When the branched (meth)acrylic copolymer resin (B) is used in an the amount of more than about 80% by weight, mechanical properties and moldability may be deteriorated.

(C) Flame Retardant

The flame retardant of the present invention may be a conventional flame retardant used in the art. Exemplary flame retardants include without limitation phosphorus-containing flame retardants, halogen-containing flame retardants, inorganic flame retardants, and the like, and combinations thereof.

In an exemplary embodiment, the flame retardant may be a phosphorus-containing flame retardant. Examples of the phosphorous-containing flame retardants may include, but are not limited to, phosphates, phosphonates, phosphinates, phosphine oxide, phosphazenes, metal salts thereof, and the like, and mixtures thereof.

Representative phosphorus-containing flame retardants include phosphate ester compounds or phosphates and may be represented by the following Chemical Formula 3.

[Chemical Formula 3]

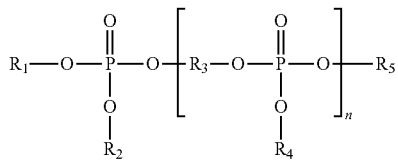

wherein $R_1$, $R_2$, $R_4$, and $R_5$ are independently $C_6$-$C_{20}$ aryl or $C_1$-$C_{10}$ alkyl substituted aryl; $R_3$ is a derivative of resorcinol, hydroquinol, bisphenol-A, bisphenol-S and the like; and n is about 0 to about 5. In some exemplary embodiments, n may be about 1 to about 5.

The aromatic phosphate ester compound may be used alone or in combination with other phosphorus-containing flame retardants.

The flame retardant thermoplastic resin composition may include a phosphorus-containing flame retardant, such as the aromatic phosphate ester compounds described herein, in an amount of about 1 to 50 parts by weight, for example about 5 to about 40 parts by weight, and as another example about 7 to about 35 parts by weight, per 100 parts by weight of a base resin of the polycarbonate resin (A) and the branched (meth) acrylic copolymer resin (B).

In some embodiments, the flame retardant thermoplastic resin composition may include a phosphorus-containing flame retardant in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the phosphorus-containing flame retardant can be in a range from about any of the foregoing amounts to about any other of the foregoing amounts.

In another exemplary embodiment, the flame retardant may be a halogen-containing flame retardant. Examples of the halogen-containing flame retardant may include, without limitation, decabromo diphenylether, decabromo diphenylethane, tetrabromo bisphenol A, tetrabromo bisphenol A-epoxy oligomer, octabromo trimethylphenyl phosphate, ethylene bistetrabromophthalimide, tris (tribromophenol)triazine, brominated polystyrene, and the like. These may be used alone or in combination with one another. In some exemplary embodiments, a halogen-containing compound which is able to melt at conventional process temperatures, for example, a halogen-containing compound having a melting point or a softening point under about 250° C. may be used. When the halogen-containing compound is used, inorganic compounds such as antimony trioxide and antimony pentoxide may be used in conventional amounts, for example about 0.001 to about 20 parts by weight, based on the total weight of the halogen-containing compound.

The halogen-containing flame retardant may be used alone or in combination with other halogen-containing flame retardants and/or inorganic compounds. The flame retardant thermoplastic resin composition of the invention may include a halogen-containing flame retardant in an amount of 1 to 50 parts by weight, for example about 10 to about 40 parts by weight, per 100 parts by weight of a base resin of the polycarbonate resin (A) and the branched (meth)acrylic copolymer resin (B). In some embodiments, the flame retardant thermoplastic resin composition may include a halogen-containing flame retardant in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the halogen-containing flame retardant can be in a range from about any of the foregoing amounts to about any other of the foregoing amounts.

(D) (Meth)Acrylic Resin

The flame retardant thermoplastic resin composition optionally further comprises a (meth)acrylic resin (D). The (meth)acrylic resin may be a homopolymer of a (meth)acrylic monomer, a copolymer of two or more (meth)acrylic monomers, or a mixture thereof. In addition, the (meth)acrylic resin may have a linear structure.

Examples of the (meth)acrylic monomer may include, but are not limited to, methyl methacrylate, ethyl methacrylate, n-propyl Methacrylate, n-butyl methacrylate, phenyl methacrylate, benzyl methacrylate, hexyl methacrylate, cyclohexyl methacrylate, phenoxy methacrylate, phenoxy ethyl methacrylate, methyl acrylate, ethyl acrylate, propyl acrylate, butyl acrylate, 2-ethylhexyl acrylate, 2-ethylhexyl methacrylate, and the like. These (meth)acrylic monomers may be used alone or in combination with one another.

The (meth)acrylic resin (D) may be prepared by conventional methods such as bulk polymerization, emulsion polymerization, and suspension polymerization, and may be easily carried out by those skilled in the art.

Further, the (meth)acrylic resin (D) may be a homopolymer or a copolymer of (meth)acrylic monomers, or a mixture thereof.

The flame retardant thermoplastic resin composition may include the (meth)acrylic resin (D) in an amount of more than 0 and up to 80 parts by weight, for example about 5 to about 70 parts by weight, as another example about 10 to about 50 parts by weight, and as another example about 10 to about 40 parts by weight, based on 100 parts by weight of (A)+(B). In some embodiments, the (meth)acrylic resin (D) may not be present (0 parts by weight). In some embodiments, the (meth) acrylic resin (D) may be present, i.e., the flame retardant thermoplastic resin composition may include the (meth) acrylic resin (D) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 parts by weight, based on 100 parts by weight of (A)+(B). Further, according to some embodiments of the present invention, the amount of the (meth)acrylic resin (D) can be in a range from about any of the foregoing amounts to about any other of the foregoing amounts. When the (meth)acrylic resin (D) is used in an the amount of more than about 80 parts by weight, good mechanical properties may not be obtained.

Generally, problems of low colorability and appearance may occur when a polycarbonate resin and a (meth)acrylic resin are blended in a ratio of about 20 to about 80:about 80 to about 20 parts by weight, due to their low compatibility Thus it can be important to improve compatibility of a polycarbonate resin and a (meth)acrylic resin when combined in an amount within this ratio range.

Copolymer particles having a branched structure (B) can prevent phase separation between the polycarbonate resin (A) and the (meth)acrylate resin (D). Further, in the melting state, the phase separation may be minimized due to a decrease in viscosity so that compatibility between these heterogeneous resins may be improved.

In addition, when a mixture of the methacrylic copolymer with high refractive index (B) and the (meth)acrylic resin (D) is blended with the polycarbonate resin, the difference between the refractive index of the (meth)acrylic resin (D) and the refractive index of the polycarbonate may be lowered due to the increased refractive index of the methacrylic copolymer resin (B). Therefore, it is possible to improve compatibility and transparency by preventing the deterioration of transparency and colorability usually occurring in a conventional mixture of a (meth)acrylic resin and a polycarbonate resin due to the difference between the refractive index of the two resins. In addition, it is possible to prepare a resin composition having high transparency and colorability by improving scratch resistance in a conventional polycarbonate resin The flame retardant thermoplastic resin composition may have improved compatibility by lowering complex viscosity. In an exemplary embodiment, the flame retardant thermoplastic resin composition may have a complex viscosity ($\eta^*$) of about 1,000 Pas to about 10,000 Pas at 240° C. and 0.1 rad/s. In another exemplary embodiment, the flame retardant thermoplastic resin composition may have a complex viscosity ($\eta^*$) of about 1,000 Pas to about 5,000 Pas at 240° C. and 0.1 rad/s. In another embodiment, the complex viscosity may be about 5,500 Pas to about 10,000 Pas. Furthermore, at 240° C., the ratio of $\eta^*(0.1\ rad/s)/\eta^*(100\ rad/s)$ can range from about 3.0 to about 100.0. When the complex viscosity is outside of the above ranges, compatibility may be deteriorated due to phase separation. In an exemplary embodiment, the ratio of $\eta^*(0.1\ rad/s)/\eta^*(100\ rad/s)$ can range from about 3.5 to about 30.0. In another exemplary embodiment, the ratio of $\eta^*(0.1\ rad/s)/\eta^*(100\ rad/s)$ can range from about 30.0 to about 75.0. In another exemplary embodiment, the ratio of $\eta^*(0.1\ rad/s)/\eta^*(100\ rad/s)$ can range from about 75.0 to about 100.0.

The flame retardant thermoplastic resin composition may further comprise one or more additives selected as appropriate depending on the end uses and desired properties of the composition. Exemplary additives may include without limitation flame retardant aids, antimicrobials, releasing agents, thermal stabilizers, antioxidants, light stabilizers, compatibilizer, pigments, inorganic fillers, surfactants, nucleating agents, coupling agents, fillers, plasticizers, impact modifiers, coloring agents, stabilizers, lubricants, antistatic agents, dyes, flameproof agents, and the like. These additives may be used alone or in combination with one another. The additive(s) may be used in conventional amounts, such as about 0.001 to about 20 parts by weight, per 100 parts by weight of a base resin of the polycarbonate resin (A) and the branched (meth)acrylic copolymer resin (B).

The present invention provides a molded article produced from the foregoing flame retardant thermoplastic resin composition. The molded article can have a total light transmittance of about 5 to about 50% measured by means of a Haze meter NDH 2000 manufactured by Nippon Denshoku Co. Ltd., a melt flow index of about 10 to about 80 g/10 min measured in accordance with ASTM D 1238, flame retardancy of V-0 measured in accordance with UL-94 at a thickness of 2.5 mm, and a scratch width of about 240 to about 320 μm measured by a ball-type scratch profile test (BSP test).

The flame retardant thermoplastic resin composition of the present invention may be prepared by conventional methods. For example, the aforementioned components and optional other additives may be mixed in a mixer together and the mixture may be melt-extruded through a conventional extruder in a pellet form, and then the resin pellets may be used to prepare plastic molded articles, for example, by injection and extrusion processes as known in the art.

Since the flame retardant thermoplastic resin composition can have excellent scratch resistance, colorability, and transparency, the thermoplastic resin composition may be molded into various articles such as housings of electrical and electronic goods, parts of automobiles, lenses, window glasses, and the like.

In some exemplary embodiments, the flame retardant scratch-resistant thermoplastic resin composition may be used in housings of electrical and electronic products such as TVs, audio sets, washing machines, cassette players, MP3 players, telephones, game devices, video players, computers, photocopiers, and the like.

In an exemplary embodiment, the flame retardant scratch-resistant thermoplastic resin composition may be used for internal or external parts of automobiles such as dashboard panels, instrumental panels, door panels, quarter panels, wheel covers, and the like.

The molding methods may include, but are not limited to, extrusion, injection, or casting molding, and may be easily carried out by those skilled in the art.

The invention may be better understood by reference to the following examples which are intended for the purpose of illustration and are not to be construed as in any way limiting the scope of the present invention, which is defined in the claims appended hereto.

EXAMPLE (A) Polycarbonate Resin

Bisphenol-A linear polycarbonate with a weight average molecular weight of 25,000 (Mw) manufactured by Teijin Chemicals Ltd. of Japan (product name: PANLITE L-1250 WP) is used.

(B) Branched Acrylic Copolymer Resin (B1) Branched Acrylic Copolymer Resin-1

The branched copolymer resin is prepared by conventional suspension polymerization of 57 parts by weight of methylmethacrylate monomer, 40 parts by weight of phenoxy ethyl methacrylate having a refractive index of 1.57 and 3 parts by weight of divinyltetramethyldisiloxane. The resulting copolymer has a refractive index of 1.51 and a weight average molecular weight of 2,000,000 g/mol.

(B2) Branched Acrylic Copolymer Resin-2

The branched copolymer resin is prepared by conventional suspension polymerization of 27 parts by weight of methylmethacrylate monomer, 70 parts by weight of phenoxy ethyl methacrylate having a refractive index of 1.57 and 3 parts by weight of divinyltetramethyldisiloxane. The resulting copolymer has a refractive index of 1.53 and a weight average molecular weight of 2,000,000 g/mol.

(B3) Branched Acrylic Copolymer Resin-3

The branched copolymer resin is prepared by conventional suspension polymerization of 47 parts by weight of methylmethacrylate monomer, 50 parts by weight of phenoxy ethyl methacrylate and 3 parts by weight of divinyltetramethyldisiloxane. The resulting copolymer has a refractive index of 1.530 and a weight average molecular weight of 2,000,000 g/mol.

(B4) Branched Acrylic Copolymer Resin-4

The branched copolymer resin is prepared by conventional suspension polymerization of 17 parts by weight of methylmethacrylate monomer, 40 parts by weight of phenoxy ethyl methacrylate, 40 parts by weight of cyclohexyl methacrylate, and 3 parts by weight of divinyltetramethyldisiloxane. The resulting copolymer has a refractive index of 1.530 and a weight average molecular weight of 2,000,000 g/mol.

(C) Flame Retardant

Bisphenol A diphosphate manufactured by Daihachi Chemical Industry Co., Ltd. of Japan (product name: CR-741) is used.

(D) (Meth)Acrylic Resin

Polymethylmethacrylate resin with a weight average molecular weight of 92,000 (Mw) manufactured by LG MMA Ltd. of South Korea (product name: L84) is used.

Examples 1 to 6 and Comparative Examples 1 to 3

The components as shown in Table 1 and a MBS-based impact modifier are added to a conventional mixer, and the mixture is extruded through a conventional twin screw extruder (L/D=29, Φ=45 mm) to prepare a product in pellet form. The pellets are dried at 80° C. for 6 hours and then molded into test specimens in a 6 oz injection molding machine.

The compatibility and the transparency of the test specimens are estimated by measuring flow mark, transparency, color and transmittance. The flow mark, transparency and color appearing on the test specimens are measured by the naked eye. The improved compatibility is confirmed by phase separation behavior through TEM images. Test specimens with dimensions of L 90 mm×W 50 mm×T 2.5 mm are used for measuring the above appearance properties.

The total light transmittance is measured using a Haze meter NDH 2000 manufactured by Nippon Denshoku, and calculated by adding diffuse light transmittance (DF) and parallel transmittance (PT). It can be estimated that the higher total light transmittance is, the better transparency is.

The melt flow index of the test specimens is measured in accordance with ASTM D 1238 at 220° C. using a balance weight of 10 kg.

The scratch resistance is measured by a ball-type scratch profile (BSP) test. The BSP test is conducted by applying a scratch of a length of 10~20 mm onto resin specimens with dimensions of L 90 mm×W 50 mm×T 2.5 mm at load of 1,000 g and a scratch speed of 75 mm/min, using a metal spherical tip with a diameter of 0.7 mm and measuring a profile of the applied scratch using a surface profile analyzer (XP-I) manufactured by Ambios Corporation which provides a scratch profile through surface scanning using a metal stylus tip with a diameter of 2 μm. The scratch resistance is evaluated based on the scratch width of the measured profile.

FIG. 1(a) illustrates a scratch profile picture of a test specimen prepared in Example 2 measured by the BSP test, and FIG. 1(b) illustrates a scratch profile picture of a test specimen prepared in Comparative Example 3. The results of scratch width are shown in the following Table 1.

To analyze phase behavior, TEM images of resin compositions of Example 2 and Comparative Example 1 are shown in FIGS. 2(a) and 2(b), respectively.

Figure 3:
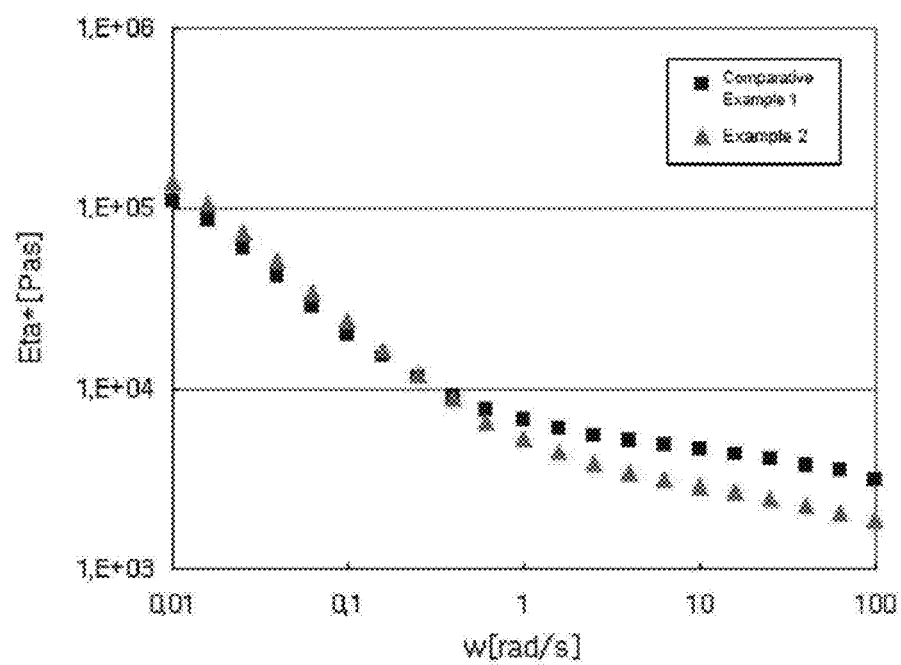
FIG. 3 is a graph comparing viscosity behavior of a specimen prepared in Example 2 with viscosity behavior of a specimen prepared in Comparative Example 1.

The viscosity behaviors of resin compositions of Example 2 and Comparative Example 1 are measured by ARES (Advanced Rheometric Expansion System) manufactured by Rheometric Scientific Corporation at 240° C., and the results are shown in FIG. 3.

TABLE 1

|  |  | Examples |  |  |  |  |  | Comparative Examples |  |  |
|---|---|---|---|---|---|---|---|---|---|---|
|  |  | 1 | 2 | 3 | 4 | 5 | 6 | 1 | 2 | 3 |
| (A) |  | 70 | 70 | 70 | 70 | 70 | 60 | 70 | 60 | 100 |
| (B) | (B1) | 15 | — | — | — | — | — | — | — | — |
|  | (B2) | — | 15 | 30 | — | — | 20 | — | — | — |
|  | (B3) | — | — | — | 30 | — | — | — | — | — |
|  | (B4) | — | — | — | — | 15 | — | — | — | — |
| (C) flame retardant |  | 18 | 18 | 18 | 18 | 18 | 25 | 18 | 25 | 18 |
| (D) |  | 15 | 15 | — | — | 15 | 20 | 30 | 40 | — |
| Flow Mark |  | X | X | X | X | X | X | ○ | ○ | X |
| Transparency and color |  | Translucent | Translucent | Translucent | Translucent | Translucent | Translucent | Opaque milky | Opaque milky | Translucent |
| Total light transmittance (TT) |  | 13.28 | 25.82 | 27.01 | 31.20 | 18.05 | 19.96 | 9.89 | 5.11 | 39.81 |
| Melt Flow Index (MI) |  | 41.8 | 50.7 | 60.2 | 48.2 | 42.7 | 58.3 | 36.9 | 44.6 | 22.1 |
| Flame retardancy |  | V0 | V0 | V0 | V0 | V0 | V0 | V0 | V0 | V0 |
| BSP Width (μm) |  | 288 | 290 | 292 | 287 | 290 | 270.7 | 290 | 270 | 345 |

(*): impossible to obtain the result of Melt flow index of Comparative Example 3 in the above conditions.

As shown in Table 1, the compositions including a blend of the polycarbonate and an acrylic resin exhibit improved scratch resistance, compared to the composition including only the polycarbonate resin (Comparative Example 3), which is also confirmed by the scratch profile (FIG. 1). The thermoplastic resins of Examples 1-6 exhibit a scratch width in a range of 240 to about 320 μm measured by a ball-type scratch profile test (BSP test) at a thickness of 0.5~5.0 mm.

With respect to flame retardancy, the flame retardant thermoplastic resin compositions of Examples 1 to 6 exhibit the level of flame retardancy of V0 or more measured in accordance with UL94.

Comparative Examples 1 and 2, which include polymethylmethacrylate resin (D) but do not include a branched (meth) acrylic copolymer resin (B), have better scratch resistance than Comparative Example 3, which includes only polycarbonate. Comparative Examples 1 and 2, however, have a flow mark and opaque appearance due to low compatibility between the resins. Examples 1 to 5 and Comparative Example 1, which include similar amounts of polycarbonate, exhibit similar levels of scratch resistance, but Examples 1 to 5, which include a branched (meth)acrylic copolymer resin, exhibit improved transparency and flow mark and high total light transmittance.

Further, when two similar branched acrylic copolymers are used, Examples 2 or 5 including the branched acrylic copolymer with high refractive index exhibit better transparency and compatibility and high total light transmittance, compared to Example 1. As a result of comparing Example 2 with Example 3, the resin compositions which do not include the acrylic resin (D) exhibit better transparency and compatibility as compared to the resin compositions which include the branched (meth)acrylic copolymer (B) mixed with the acrylic resin (D) at a ratio of 50 to 50.

Without being bound by any explanation or theory of the invention, it is currently believed that the improved compatibility is caused by the control of refractive index and the minimization of phase separation, and the result of complex viscosity of the composition is confirmed through the results of ARES. As shown in FIG. 3, the complex viscosity measured by ARES shows a tendency to decrease, as the frequency (rad/s) increases from 0.1 to 100, and Example 2 exhibits a more significant decrease than Comparative Example 1.

Figure 2:
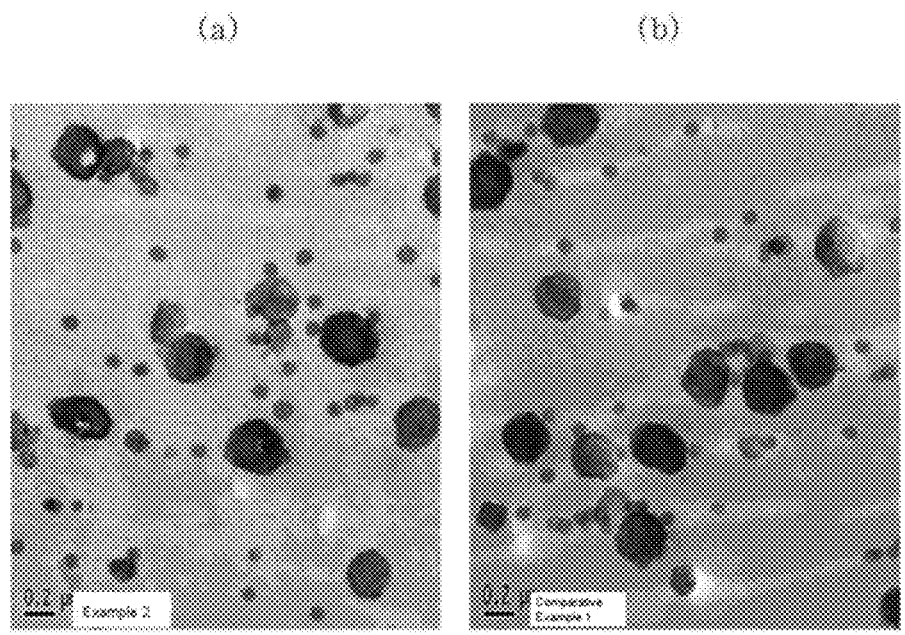
FIG. 2(*a*) is a transmission electron microscope (TEM) image of a specimen prepared in Example 2 and FIG. 2(*b*) is a transmission electron microscope (TEM) image of a specimen prepared in Comparative Example 1.

The improved compatibility between polycarbonate and polymethylmethacrylate in the compositions of the invention is also confirmed by the TEM images of FIGS. 2(a) and (b). FIG. 2 (b) illustrates that Comparative Example 1 exhibits that the polymethylmethacrylate has a continuous phase and large domain in a polycarbonate base due to lowered compatibility, and FIG. 2 (a) illustrates that Example 2 exhibits improved compatibility since the phase size of polymethylmethacrylate decreases and spherical phase behavior is shown.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame retardant thermoplastic resin composition comprising:
   (A) about 20 or more but less than about 100% by weight of a polycarbonate resin;
   (B) more than about 0 but not more than about 80% by weight of a branched (meth)acrylic copolymer resin, wherein said branched (meth)acrylic copolymer resin (B) is a copolymer or a mixture of copolymers of (b1) an aromatic methacrylate, an aliphatic methacrylate, or a mixture thereof represented by the following Chemical Formula 1, Chemical Formula 2, or a mixture thereof, (b2) optionally a mono-functional unsaturated monomer selected from the group consisting of methacrylic acid ester monomers, acrylic acid ester monomers, unsaturated carboxylic acid monomers, acid anhydride monomer, hydroxyl group containing ester monomer, and mixtures thereof, and (b3) a branch-inducing monomer:

[Chemical Formula 1]

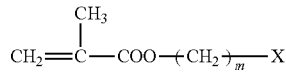

wherein m is an integer from 0 to 10, and X comprises a cyclohexyl group, a phenyl group, a methylphenyl group, a methylethylphenyl group, a propylphenyl group, a methoxyphenyl group, a cyclohexylphenyl group, a chlorophenyl group, a bromophenyl group, a phenylphenyl group, or a benzylphenyl group;

[Chemical Formula 2]

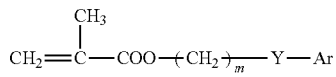

wherein m is an integer from 0 to 10, Y is oxygen(O) or sulfur(S), and Ar comprises a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group; and
   (C) about 1 to about 50 parts by weight of a flame retardant, per 100 parts by weight of a base resin comprising (A)+(B),
   wherein the branched (meth)acrylic copolymer resin (B) has a weight average molecular weight of about 1,000,000 to about 3,500,000.

2. The flame retardant thermoplastic resin composition of claim 1, wherein said branched (meth)acrylic copolymer resin (B) has a refractive index of about 1.495 to about 1.575.

3. The flame retardant thermoplastic resin composition of claim 1, wherein said branched (meth)acrylic copolymer resin (B) is a copolymer of about 5 to about 99.999% by weight of the aromatic methacrylate, aliphatic methacrylate, or a mixture thereof, (b1), about 0 to about 85% by weight of the mono-functional unsaturated monomer (b2), and about 0.001 to about 10% by weight of the branch-inducing monomer, or a mixture of copolymers thereof.

4. The flame retardant thermoplastic resin composition of claim 1, wherein said aromatic methacrylate, aliphatic methacrylate, or a mixture thereof (b1) comprises cyclohexyl methacrylate, phenoxy methacrylate, phenoxyethyl methacrylate, 2-ethylthiophenyl methacrylate, phenyl methacrylate, benzyl methacrylate, 2-phenylethyl methacrylate, 3-phenylpropyl methacrylate, 4-phenylbutyl methacrylate, 2-(2-methylphenyl)ethyl methacrylate, 2-(3-methylphenyl)ethyl methacrylate, 2-(4-methylphenyl)ethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, or a mixture thereof.

5. The flame retardant thermoplastic resin composition of claim 1, wherein said methacrylic acid ester monomer comprises methyl methacrylate, ethyl methacrylate, n-propyl methacrylate, n-butyl methacrylate, hexyl methacrylate, 2-ethylhexyl methacrylate or a mixture thereof; said acrylic acid ester monomer comprises methyl acrylate, ethyl acrylate, propyl acrylate, butyl acrylate, hexyl acrylate, 2-ethyl hexyl acrylate or a mixture thereof; said unsaturated carboxylic acid monomer comprises acrylic acid, methacrylic acid, or a mixture thereof; said acid anhydride monomer comprises maleic anhydride; and said hydroxyl group containing ester monomer comprises 2-hydroxyethyl acrylate, 2-hydroxypropyl acrylate, monoglycerol acrylate or a mixture thereof.

6. The flame retardant thermoplastic resin composition of claim 1, wherein said branch-inducing monomer (b3) comprises at least one monomer comprising a silane or siloxane compound; aromatic crosslinking monomer; vinyl group-containing monomer; allyl compound; (poly)alkylene glycol di(meth)acrylate compound; or a mixture thereof.

7. The thermoplastic resin composition of claim 6, wherein said silane or siloxane compound comprises an unsaturated hydrocarbon group-containing silicone-containing crosslinking monomer; said aromatic crosslinking monomer comprises divinylbenzene; said vinyl group-containing monomer comprises 1,4-divinyloxybutane, divinylsulfone, or a mixture thereof; said allyl compound comprises diallyl phthalate, diallylacrylamide, triallyl (iso)cyanurate, triallyl trimelitate, or a mixture thereof; and said (poly)alkylene glycol di(meth) acrylate compound comprises 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, glycerol tri(meth)acrylate, or a mixture thereof.

8. The flame retardant thermoplastic resin composition of claim 1, wherein said thermoplastic resin composition further comprises (D) more than 0 and up to 80 parts by weight of (meth)acrylic resin, based on 100 parts by weight of (A)+(B).

9. The flame retardant thermoplastic resin composition of claim 8, wherein said (meth)acrylic resin (D) has a linear structure.

10. The flame retardant thermoplastic resin composition of claim 9, wherein said (meth)acrylic resin (D) comprises a homopolymer of a (meth)acrylic monomer, a copolymer of (meth)acrylic monomers, or a mixture thereof.

11. The flame retardant thermoplastic resin composition of claim 10, wherein said (meth)acrylic monomer (D) comprises methyl methacrylate, ethyl methacrylate, n-propyl methacrylate, n-butyl methacrylate, phenyl methacrylate, benzyl methacrylate, hexyl methacrylate, cyclohexyl methacrylate, phenoxy methacrylate, phenoxy ethyl methacrylate, methyl acrylate, ethyl acrylate, propyl acrylate, butyl acrylate, 2-ethylhexyl acrylate, 2-ethylhexylmethacrylate, or a mixture thereof.

12. The flame retardant thermoplastic resin composition of claim 1, wherein said flame retardant (C) comprises a phosphorus-containing flame retardant; halogen-containing flame retardant; or a mixture thereof.

13. The flame retardant thermoplastic resin composition of claim 12, wherein said phosphorous-containing flame retardant comprises a phosphate, a phosphonate, a phosphinate, a phosphine oxide, a phosphazene, a metal salt thereof, or a mixture thereof.

14. The flame retardant thermoplastic resin composition of claim 12, wherein said halogen-containing flame retardant comprises decabromo diphenylether, decabromo diphenylethane, tetrabromo bisphenol A, tetrabromo bisphenol A-epoxy oligomer, octabromo trimethylphenyl phosphate, ethylene bistetrabromophthalimide, tris (tribromophenol)triazine, brominated polystyrene, or a mixture thereof.

15. The flame retardant thermoplastic resin composition of claim 1, wherein said resin composition further comprising one or more additives selected from the group consisting of flame retardant aids, antimicrobials, releasing agents, thermal stabilizers, antioxidants, light stabilizers, compatibilizers, dyes, inorganic fillers, surfactants, nucleating agents, coupling agents, fillers, plasticizers, impact modifiers, coloring agents, stabilizers, lubricants, antistatic agents, pigments, flameproof agents, and mixtures thereof.

16. The flame retardant thermoplastic resin composition of claim 15, wherein said flame retardant thermoplastic resin composition has a complex viscosity($\eta^*$) of about 1,000 Pas to about 10,000 Pas at 240° C. and 0.1 rad/s, and the ratio of $\eta^*(0.1 \text{ rad/s})/\eta^*(100 \text{ rad/s})$ ranges from about 3.0 to about 100.0 at 240° C.

17. A molded article molded from the flame retardant resin composition of claim 1, wherein said molded article has a total light transmittance of about 5 to about 50% measured by means of a Haze meter NDH 2000 manufactured by Nippon Denshoku Co. Ltd., a melt flow index of about 10 to about 80 g/10 min, measured in accordance with ASTM D 1238(220° C., 10 kg), and a scratch width of about 240 to about 320 μm measured by a ball-type scratch profile test (BSP test).

18. The flame retardant thermoplastic resin composition of claim 1, wherein the branched (meth)acrylic copolymer resin (B) comprises (b1) an aromatic methacrylate, an aliphatic methacrylate, or a mixture thereof represented by Chemical Formula 2.

19. The flame retardant thermoplastic resin composition of claim 1, wherein said branch-inducing monomer (b3) comprises a silane or siloxane compound.

* * * * *